July 28, 1959 TOM T. KUMAGAI 2,897,480

ERROR DETECTING SYSTEM

Filed July 27, 1954 2 Sheets-Sheet 1

INVENTOR.
TOM T. KUMAGAI,
BY
Henry Heyman
ATTORNEY.

July 28, 1959 TOM T. KUMAGAI 2,897,480

ERROR DETECTING SYSTEM

Filed July 27, 1954 2 Sheets-Sheet 2

INVENTOR.
TOM T. KUMAGAI,
BY
Henry Heyman
ATTORNEY.

2,897,480

ERROR DETECTING SYSTEM

Tom T. Kumagai, West Los Angeles, Calif., assignor to Hughes Aircraft Company, Culver City, Calif., a corporation of Delaware Application July 27, 1954, Serial No. 446,130

5 Claims. (Cl. 340—147)

This invention relates to error detecting systems for monitoring information transcription and, more particularly, to an error detecting system for indicating any error which may occur in the transfer of a group of binary-coded information data from a source to a receiver through a transfer medium.

Error detecting systems, such as are contemplated by the present invention, are adapted to indicate any error occurring in the transfer of information data, in binary signal form, from a source to a receiver through a transfer medium, such as an electromagnetic or electrostatic memory device. Such error detecting systems are necessary where large quantities of data must be accurately transferred without error; the usefulness of the entire datum group being dependent upon knowledge that no error has occurred in the transfer.

The prior art offers various systems and methods for checking the accuracy of transferring binary-coded information datum groups from a source to a receiver through a transfer medium. In one known system, the information data to be transferred is duplicated and both the original and duplicate information data are either simultaneously or serially transferred through the transfer medium and compared at the receiver; an error in the transfer being indicated by any dissimilarity between the original and duplicate data at the receiver. A disadvantage of the duplication system, in addition to the added circuitry necessary for the duplication process, is the burden of transferring duplicate information data. Where the original and duplicated information data are serially transferred through the transfer medium, the transfer in and transfer out time required is greatly increased. Where the original and duplicate information data are simultaneously transferred, the transfer in and transfer out circuitry, as well as the transfer medium capacity, must be greatly enlarged.

Another prior art system for checking the accuracy in transferring binary-coded information datum groups through a transfer medium, sometimes referred to as a "code selection error checking system," employs selecting a code which will provide the same number of binary 1's or 0's for each information datum. For example, one known system makes use of a 7 binary-digit code wherein but 5 of the 7 digits may be used for useful information, the remaining 2 digits being selected to cause each 7 digit group to have a predetermined number of binary 1's or 0's. In accordance with a simpler version of the above procedure, well known in the prior art, a single binary digit is added to each datum-representing code group in order to provide code groups having an even number of binary 1's or 0's. This latter system is often referred to as a parity checking system. The code selection and parity error checking systems have the inherent disadvantage of not detecting transpositional errors wherein the order or position of the binary digits is incorrectly transferred but the binary 1 and 0 count remains unchanged.

All the above mentioned error checking systems require the transfer of non-information-carrying signals along with the data signals thus decreasing the efficiency of the transfer medium and associated components. This is is an important disadvantage. In a digital computer, for example, where heat dissipation and compactness of packaging are of concern, component as well as functional efficiency become paramount considerations.

Accordingly, it is an object of the present invention to provide a highly efficient error detecting system for supervising the transfer of binary-coded datum groups from a source to a receiver through a transfer medium.

Another object of the present invention is to provide an electronic error detecting system of the type referred to wherein the information datum groups are in binary electrical signal form and which requires the transfer of information-carrying signals only, neither the generation nor the transfer of non-information binary signals being required.

A further object of the present invention is to provide an electronic error detecting system of the type referred to for selectively complementing the binary digits of a predetermined indicator datum in accordance with corresponding binary digits of the datum group at the source and at the receiver to form a monitor datum.

Yet another object of the present invention is to provide an error detecting system, operable in combination with a binary-coded data handling system, that is capable of detecting transpositional errors.

It is still a further object of the present invention to provide an error detecting system which may be utilized with a digital printing circuit for monitoring the printing of binary-coded datum groups received by the printer from an information data source.

In accordance with the present invention, information-carrying binary digits only are transferred, and a monitor datum is formed by selectively complementing the binary digits of a predetermined indicator datum in accordance with corresponding binary 1 or 0 digits at the source and at the receiver without propagation of a carry between adjacent binary digit places; the presence or absence of an error in transference being determinable by examining the monitor datum obtained.

In its basic structural form, an error detecting system in accordance with the present invention comprises a control matrix which produces a plurality of control signals in response to the binary signals of the datum group at the source and of the datum group at the receiver, a check register including a series of bistable storage elements such as flip-flops, one bistable storage element being provided for each control signal, for producing a series of binary output signals representing the indicator and monitor datum, and an error circuit responsive to the binary output signals for producing a binary signal indicating the accuracy of transference of the datum group from the source to the receiver.

An error detecting system according to the present invention may be used in combination with a utilization device wherein groups of coded information data are received from a source such as a magnetic tape storage unit, stored in a transfer storage medium, and transferred from the storage medium to the utilization device at a speed determined by the utilization device; the transfer and utilization of the datum groups being supervised by the error detecting system. More specifically, the error detecting system of the present invention may be used in combination with a type-character printing system for supervising the type-character printing on paper of characters represented by groups of binary-coded information data obtained from the source in the form of binary electrical signals. Usually the actual printing mechanisms are unable to keep pace with the inflow of information data necessitating the temporary storage of groups of data in a transfer storage medium, such as a magnetic memory device.

Where the error detecting system is used with a digital printing system, the error detecting system receives the binary signals, representing the information datum group to be printed, from the source, and the binary signals of each datum printed by the printing mechanisms, and produces a binary signal indicative of the accuracy in printing of the datum group received by the printer.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Figure 1:
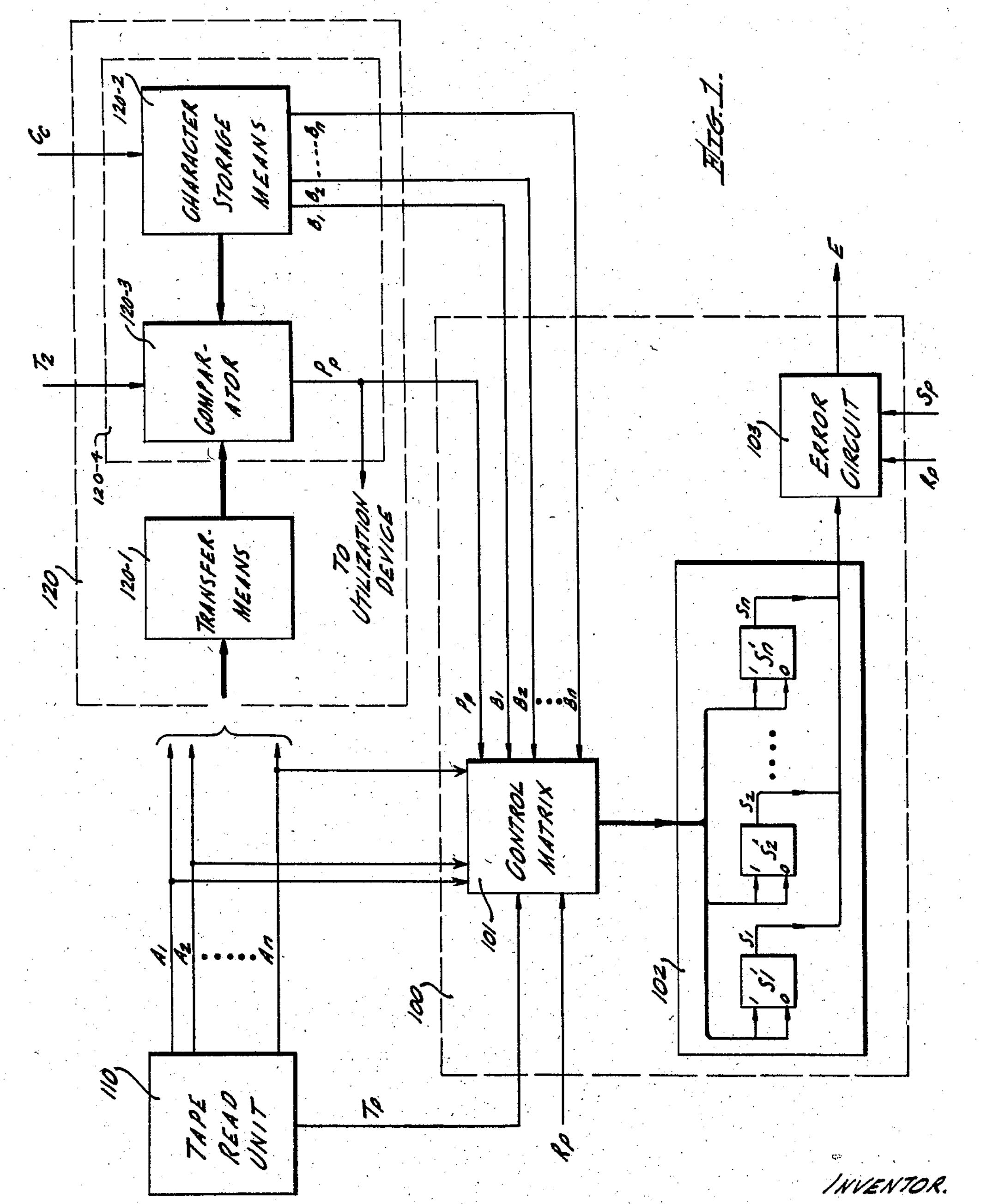
Fig. 1 is a schematic diagram in block form of an embodiment of the error detector of the present invention in combination with a printing system for printing in type characters information data read from a magnetic tape unit.

Reference is now made to Fig. 1 wherein there is illustrated an error detecting system 100 (indicated by broken lines) according to the present invention for supervising the transfer of a binary-coded information datum block or group from a source 110, such as a tape read unit, to a receiver 120–4 (indicated by broken lines) through a transfer means 120–1. The receiver 120–4 and the transfer means 120–1 form a printing circuit 120 indicated by broken lines. Each datum at the source 110 and at the receiver 120–4 is represented by a group of binary-digit signals $A_1$, $A_2$, . . . $A_n$, and $B_1$, $B_2$, . . . $B_n$, respectively, $n$ being the number of binary digits representing each datum. Both the A and B datum signals are impressed on the error detecting system 100. In addition to the binary digit signals, the source 110 produces, in synchronism with each datum at the source, a timing pulse $T_p$, and the receiver 120–4 produces a similar timing pulse $P_p$ in synchronism with each datum at the receiver, both pulses $T_p$ and $P_p$ being impressed on the error detecting system as indicated. Immediately following the final $P_p$ signal of the datum group, a reset pulse $R_p$ and a setting pulse $S_p$ are successively produced by a utilization device, such as a printing mechanism, tape perforator, or automatic machinery equipment (not shown), which are impressed on the error detecting system 100. The timing, reset, and setting pulses are all similarly shaped pulses having sharp wave fronts for coordinating the operation of the error detecting system 100 with the source 110 and with the receiver 120–4. As indicated in Fig. 1, the error detecting system 100 in response to binary digit signals $A_1$, $A_2$, . . . $A_n$, and $B_1$, $B_2$, . . . $B_n$, and pulses $T_p$, $P_p$, $R_p$ and $S_p$ produces a binary signal E. The value of the binary signal E, immediately following each $R_p$ pulse, indicates the accuracy achieved in transferring the preceding datum group from the source 110 to the receiver 120–4.

The error detecting system 100 of Fig. 1 is seen to include a control matrix 101 which receives signals $A_1$, $A_2$, . . . $A_n$, and $T_p$ from the tape read unit 110, signals $B_1$, $B_2$, . . . $B_n$ and $P_p$ from the receiver 120–4, and signals $R_p$ from the utilization device (not shown), and produces a series of $n$ pairs of binary control or first output signals which are impressed on a check register 102, $n$ being defined as above. The check register 102 includes $n$ flip-flops $S_1'$, $S_2'$, . . . $S_n'$ producing signals $S_1$, $S_2$, . . . $S_n$, respectively, indicating their stable state. Each $S_1'$, $S_2'$, . . . $S_n'$ flip-flop has a 1 and a 0 input circuit responsive to one associated pair of binary control signals, produced by the control matrix 101, for assuming an initial stable state for producing a binary indicator signal and assuming a final stable state for producing a binary monitor or second output signal. An error circuit 103, in response to the binary signals $S_1$, $S_2$, . . . $S_n$ from the check register 102 and signals $R_p$ and $S_p$ impressed thereon from the utilization device, produces the binary signal E.

The error detecting system 100 of the present invention may be used in combination with a utilization device or circuit, such as a printing circuit, a tape perforator or an automatic machine tool, for supervising the transfer and utilization of binary-coded information datum groups from a source, such as the tape read unit 110 to the utilization mechanism (not shown). For example, in a printing system for reproducing in type characters the datum groups from the source 110, the printing system may include a printing circuit 120 (indicated by broken lines) for receiving and temporarily storing signals $A_1$, $A_2$, . . . $A_n$ from the tape read unit 110 and producing pulses $P_p$ for actuating the printing mechanisms (not shown) at a speed commensurate with the operational speed of the printing mechanisms. As shown in the figure, the printing circuit 120 includes a transfer means 120–1 and a receiver 120–4. The transfer means 120–1 may be any storage device, such as a magnetic or electrostatic memory, for temporarily storing an entire datum group represented by signals $A_1$, $A_2$, . . . $A_n$ and producing similar output binary digit signals which are received by the receiver 120–4 as indicated. During each time interval that the printing mechanism (not shown) is ready to print a type character form, the printing mechanism produces a 1-representing $T_2$ signal which is impressed on a comparator 120–3, and each time the printing mechanism changes from one type character form to another, a changing pulse $C_c$ is produced which is impressed on a character storage means 120–2. The receiver 120–4 in response to the binary digit signals from the transfer means 120–1, 1-representing $T_2$ signals and pulses $C_c$ produces the pulses $P_p$. The printing mechanisms, in response to pulses $P_p$, print in type characters the information datum group represented by signals $A_1$, $A_2$, . . . $A_n$.

The receiver 120–4 includes the character storage means 120–2 and the comparator 120–3. The character storage means 120–2 is a re-cycling counter which simultaneously produces, at any instant, binary signals $B_1$, $B_2$, . . . $B_n$ representing the count at that instant, and is responsive to each changing pulse $C_c$ from the printing mechanisms for successively counting in an arbitrarily preselected sequence. A counting cycle is chosen which includes within a complete counting cycle, combinations of signals $B_1$, $B_2$, . . . $B_n$ representing all possible utilized datum produced by the tape read unit 110.

For example, the character storage means 120–2 may be formed from a plurality of flip-flops associated with one another to provide at any instant an indication of the number of $C_c$ signals introduced to the storage means. The flip-flops are so interrelated that they have an individual pattern of operation for each representation of a different digit. By way of illustration, the storage means 120–2 may provide an indication of "1" upon the introduction of the first $C_c$ pulse to the storage means, an indication of "2" upon the introduction of the second $C_c$ pulse to the storage means and an indication of "3" upon the introduction of the third $C_c$ pulse to the storage means. The storage means 120–2 may be constructed in a manner similar to the character counter 134 in co-pending application Serial No. 379,045, filed September 8, 1953, now Patent No. 2,850,566, by Eldred C. Nelson and assigned to the assignee of this application.

The pulses $C_c$ introduced to the character storage means 120-2 may be periodic pulses corresponding to clock pulses. This is in accordance with co-pending application Serial No. 379,045, which discloses that the character counter 134 in that application is connected to a clock pulse generator 112. The signals $T_2$ introduced to the comparator 120-3 may also be clock signals. This is in accordance with co-pending application Serial No. 379,045, which discloses a connection from the clock pulse generator 112 to a comparator network 136 corresponding to the comparator 120-3 in this application.

As disclosed in co-pending application Serial No. 379,045, the signals corresponding to the $T_2$ and $C_c$ signals may be derived from the same clock pulse generator. The $C_c$ signals may represent a first group of sequential signals from the clock pulse generator and the signals $T_2$ may represent a second group of signals from the generator. In certain instances such as in co-pending application Serial No. 379,045, some of the signals in the $C_c$ group may correspond to some of the signals in the $T_2$ group and other signals in the $C_c$ group may not coincide with the signals in the $T_2$ group. This is obtained by blanking out some of the clock signals against introduction to the comparator 120-3 and blanking out other clock signals against introduction to the character storage means 120-2. Actually, however, the $T_2$ signals can correspond with the $C_c$ signals in some uses of this invention.

Both the data signals from the transfer means 120-1 and signals $B_1, B_2, \ldots B_n$ from the character storage means are impressed on the comparator 120-3. During each count of the character storage means 120-2 each datum of the entire datum group stored in the transfer means 120-1 is serially received by the comparator 120-3. When a datum received from the transfer means 120-1 is the same as a datum represented by signals $B_1, B_2, \ldots B_n$ received from the character storage means 120-2, and when signal T2 is a 1-representing signal, the comparator 120-3 produces a $P_p$ pulse which is applied to the printing mechanism or other utilization device; the utilization device responding to each $P_p$ signal to reproduce a type character or otherwise utilize the datum represented by the permutation of signals $B_1, B_2, \ldots B_n$, at that instant. It should be noted that the data read from the source 110 in synchronism with the synchronizing pulse $T_p$, may be transferred into the storage device 120-1 either serially or in parallel, and similarly the data may be received by the comparator 120-3 from the storage device 120-1 and from the character storage means 120-2 serially or in parallel.

Figure 3:
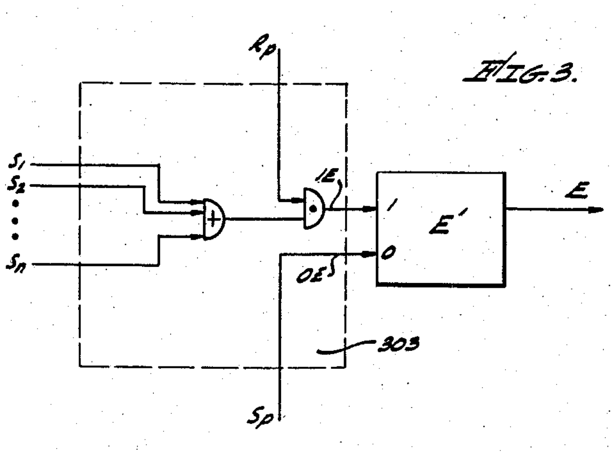
Fig. 3 is a schematic circuit diagram partly in block form of the error circuit included in the error detector of Fig. 1.

The construction of one type of comparator is shown in Figure 3 of the drawings and disclosed in the specification of co-pending application Serial No. 379,045. As disclosed in the co-pending application, the comparator 120-3 operates to compare corresponding pairs of signals upon the introduction of a $T_2$ signal. For example, the comparator 120-3 compares the $A_1$ signal introduced to the transfer means 120-1 with the $B_1$ signal produced by the character storage means 120-2. Similarly, the comparator 120-3 operates to obtain a respective comparison between the $A_2$ and $A_3$ signals introduced to the transfer means 120-1 and the $B_2$ and $B_3$ signals produced by the character storage means 120-2.

The comparison between the pairs of signals from the transfer means 120-1 and the storage means 120-2 is facilitated by the fact that each of the signals is produced on a separate line. This allows proper connections to be made to different "and" networks. For example, a comparison between the $A_1$ and $B_1$ signals can be made by introducing only these signals to an "and" network adapted to pass a signal only when $A_1$ and $B_1$ are both true. Similarly, a second "and" network can be connected to pass a signal only when both $A_1$ and $B_1$ are false. Third and fourth networks can be respectively connected to pass signals only when both $A_2$ and $B_2$ are true or when both $A_2$ and $B_2$ are false.

By connecting the different "and" networks in the comparator 120-3 in a proper manner, the comparator can be made to produce an output signal only at certain times. Such an output signal would be produced by the comparator 120-3 only when the $A_1, A_2, A_3 \ldots A_n$ signals from the transfer means 120-1 respectively correspond to the $B_1, B_2, B_3 \ldots B_n$ signals from the storage means 120-2. Such an output signal is illustrated at $P_p$ in Figure 1.

The $P_p$ signal is introduced to a utilization device such as a printer to activate the printer for the recording of the information presently available in the printer such as on a printing cylinder forming a part of the printer. The printing cylinder may correspond to the printing cylinder 132 in co-pending application Serial No. 379,045. The information on the printing cylinder can be varied in a sequential manner in accordance with the introduction of the $C_c$ pulses to the printer. For example, the first $C_c$ pulse would cause the printing cylinder to rotate to position "1" and the second $C_c$ pulse would cause the printing cylinder to rotate to position "2." In this way, the information made available by the printing cylinder for printing would correspond at any instant to the indications in the storage means 120-2.

As shown in Fig. 1, signals $A_1, A_2, \ldots A_n$, and $T_p$ from the source 110, and signals $B_1, B_2, \ldots B_n$ and $P_p$ from the receiver 120-4 are applied to the error detection system 100 which produces a 0-representing binary signal E if the information datum group from the source 110 has been accurately reproduced by a utilization circuit 120 including the transfer means 120-1, the comparator 120-3, and the character storage means 120-2, and a 1-representing E signal if an error in reproduction has occurred.

Before discussing the detailed structure of the error detection system 100 of Fig. 1, it is advantageous at this point to consider some of the basic concepts, according to the present invention, of monitoring the transfer of information data, in binary-coded form, from a source through a transfer medium to a receiver.

In general, the transfer or transmission of information from a source to a receiver may be considered as a process of duplicating or reproducing the original information at the receiver, the accuracy of the transfer being determinable by a comparison of the original and reproduced information data. By selectively complementing the binary digits of an indicator datum in accordance with the corresponding binary digits of the original and duplicate information data, a resultant monitor datum is formed having the value of the original indicator datum if the original information data has been accurately reproduced. For example, if a single binary digit, either a binary 1 or 0 is duplicated, and a selected indicator digit, such as a binary 1, complemented when the original digit is a binary 1 and again complemented when the duplicate digit is a binary 1 but unchanged when the original and duplicate digits are binary 0's, then the resultant monitor digit should be a binary 1 regardless of the value of the original digit. The above process is hereinafter referred to as "selective-one-complementing." It is obvious that "selective-zero-complementing," that is, selectively complementing the indicator digit in response to original and duplicate binary 0's, will produce the same resultant monitor digit. Similiarly if a datum of information, represented by a series or group of binary digits, is duplicated, and the binary digits of an indicator datum are selective-one-complemented or selective-zero-complemented in accordance with the corresponding binary digits of the original and duplicate series, without propagation of a carry between adjacent binary digit places, the resultant monitor datum will be equal to the original monitor datum if the information datum has been accurately reproduced. The term "monitor datum" in the preceding sentence is intended to mean the signals from the check register 102 and specifically the signals from the $S_1'$, $S_2'$ . . . $S_n'$ flip-flops in the check register. The term "information datum" is intended to mean the signals introduced to the control matrix 101 from the tape read unit 110 and from the character storage means 120–2. When the binary digits of the indicator datum are all zeros and are selectively-one-complemented in accordance with corresponding binary digits of the original and duplicate series, without propagation of a carry between adjacent digit places, the process is known in the prior art, as "half-adding" and for convenience in discussion the result so formed will hereinafter be referred to as the "half-added sum."

Although the following discussion is limited to the formation of the monitor datum by selective-one-complementing of an indicator datum represented by a series of binary 0's, it should be understood at the outset that the principles of the present invention herein taught are equally adaptable to embodiments wherein any desired permutation binary code group is used as an indicator datum and wherein the monitor datum is formed by either selective-one-complementing or selective-zero-complementing.

In the process of half-adding a group of binary-coded data, since no carry is propagated between adjacent binary digit places, the half-added sum may be expressed as a function of one binary digit place of the half-added sum, and the same function will be applicable for each binary-digit place. Each of the binary digit place signals $A_1$, $A_2$, . . . $A_n$, such as $A_1$, may be represented by a number of binary digits $A^1$, $A^2$, $A^3$ . . . . It should be appreciated that all of the binary digits $A^1$, $A^2$, $A^3$ . . . may represent values for the same binary digit place such as the fourth position in a six-digit number. This will be seen more clearly from the following discussion which indicates that a subscript such as the subscript $j$ in $A^1{}_j$ indicates the particular digit in a multi-digit number. Thus, an indication having a value $A^1$ in the fourth digital position of a multi-digital number would be represented as $A^1{}_4$. Thus, the half-added sum $S^1{}_j$ of binary digits $A^1{}_j$ and $B^1{}_j$ in the corresponding binary digit place of a datum $A^1$ and $B^1$, respectively, may be expressed in logical Boolean form as:

$$S_j^1 = A_j^1 \cdot \overline{B}_j^1 + \overline{A}_j^1 \cdot B_j^1$$

where subscript $j$ represents a binary digit place between 1 and $n$, and the presence of a bar ($^-$) over a binary signal indicates the complement of the signal, and where the dot (.) signifies the logical "and," and the plus (+) the logical "or." If data $A^2{}_j$ and $B^2{}_j$ are half-added to the $S^1{}_j$ result above, the half-added sum $S^2{}_j$ may be written:

$$S_j^2 = \overline{S}_j^1 (A_j^2 \cdot \overline{B}_j^2 + \overline{A}_j^2 \cdot B_j^2) S_j^1 (A_j^2 \cdot B_j^2 + \overline{A}_j^2 \cdot \overline{B}_j^2)$$

The term $S^1{}_j$ represents a first half-added sum for the $j$ position in a multi-digital number. The term $S^1{}_j$ is obtained by combining first values of A and B for the $j$ position, as represented by $A^1{}_j$ and $B^1{}_j$ for true values of A and B and $\bar{A}^1{}_j$ and $\bar{B}^1{}_j$ for false values of A and B. The term $S^2{}_j$ represents a second half-added sum for the $j$ position in a multi-digital member. It is obtained by combining second values of A and B for the $j$ position and the value of S after the first half-added sum for the $j$ position.

When the value of S is true for the $j$ position after the first half-addition as represented by an indication of $S^1{}_j$, certain combinations of A and B representing second values for the $j$ position cause S to remain true. A true value of S after the second half-addition in the $j$ position can be represented as $S^2{}_j$. When the value of S is false after the first half-addition in the $j$ position as represented by $\bar{S}^1{}_j$, other combinations of A and B cause S to become true after the second half-addition. This is indicated by the above equation for $S^2{}_j$.

From the above, a general function for each binary digit place $j$ of the half-added sum $S'_j$ of two groups of data A and B, respectively, may be expressed in terms of the accumulated half-added sum, $S_j$, and the presently considered $A_j$ and $B_j$ datum signals; thus:

$$S_j' = \overline{S}_j (A_j \cdot \overline{B}_j + \overline{A}_j \cdot B_j) + S_j (A_j \cdot B_j + \overline{A}_j \cdot \overline{B}_j)$$

It is obvious from the derivation of the above general function for each binary digit place of the half-added sum of the A (such as $A^1{}_j$, $A^2{}_j$, and $B^1{}_j$, $B^2{}_j$, for example) and B data, that the function is independent of the order in which the A and B data are half-added. For example, the data may be simultaneously half-added in a parallel operating species of the present invention, or they may be serially half-added. First addition of the A data on a parallel basis and subsequent addition of the B data on a parallel basis will be described in detail hereinafter. It is believed that a person skilled in the art will be able to perform other types of half-addition from the logical equations and discussion in this specification. These include serial or parallel half-addition during the simultaneous introduction of the A and B data.

Again the A data may first be half-added in parallel or serially, and later the B data half-added either in parallel or serially to the half-added sum of the A datum group.

Thus, in Fig. 1, all the $A_1$, $A_2$, . . . $A_n$ signals of the A datum group and all the $B_1$, $B_2$, . . . $B_n$ signals of the B datum group may be simultaneously received by the control matrix 101 of the error detection system 100 of the present invention, and the combined half-added sum entered into flip-flops $S_1$, $S_2$, . . . $S_n$ in the check register 102 in accordance with the function. On the other hand, signals $A_1$, $A_2$, . . . $A_n$ may be serially received by the control matrix 101, their half-added sum entered into flip-flops $S_1$, $S_2$, . . . $S_n$, and the $B_1$, $B_2$, . . . $B_n$ signals half-added to the above sum giving the final composite half-added sum of the A and B datum groups.

The control matrix 101 is adapted to receive the $B_1$, $B_2$ . . . $B_n$ information only when the $P_p$ pulse is produced. This may be seen from the logical circuitry shown in Figure 2, which indicates that $B_1$, $B_2$ . . . $B_n$ signals can pass only upon the introduction of a $P_p$ pulse. Since the $P_p$ pulse is produced only when the $B_1$, $B_2$ . . . $B_n$ signals correspond to the $A_1$, $A_2$ . . . $A_n$ signals, only the proper $B_1$, $B_2$ . . . $B_n$ signals are allowed to pass into the control matrix 101.

As will be described in detail hereinafter, the $A_1$, $A_2$ . . . $A_n$ pulses are first introduced on a parallel basis to the control matrix 101 upon the occurrence of the $T_p$ timing pulse. By "parallel basis" is meant the simultaneous introduction of the $A_1$, $A_2$ . . . $A_n$ signals to the control matrix 101. The $B_1$, $B_2$ . . . $B_n$ signals are subsequently introduced on a parallel basis to the control matrix 101 when the $P_p$ signal is produced by the comparator 120–3.

Since, in Fig. 1, each binary-digital place of the half-added sum of the datum group at the source 110 and the datum group at the receiver 120–4 is entered into a flip-flop included in the check register 102, it is necessary to consider the general form of equations defining the input functions for flip-flops. A brief discussion here will suffice since the theory of flip-flop control functions is discussed in considerable detail in copending U.S. patent applications Serial No. 327,567, for "Binary-Coded Flip-Flop Counters," by Eldred C. Nelson, filed December 23, 1952, now Patent No. 2,816,223, and Serial No. 327,131, for "Binary-Coded Flip-Flop Counters," by Robert Royce Johnson, filed December 20, 1952, now Patent No. 2,853,238. Co-pending applications Serial No. 327,567 and 327,131 are assigned to the assignee of this application.

The operation of the S flip-flop in the $j$ position may be expressed as $$1S_j = A_j . \bar{B}_j + \bar{A}_j . B_j$$
$$0S_j = A_j . \bar{B}_j + \bar{A}_j . B_j + R_p$$

These equations essentially control the triggering of the S flip-flop in the $j$ position to the true or false states of the flip-flop. In the above equations, $1S_j$ represents the triggering of the S flip-flop for the $j$ position to the true state of the flip-flop. In like manner, $0S_j$ represents the triggering of the S flip-flop for the $j$ position to the false state of the flip-flop.

As will be seen, the S flip-flop is triggered from one state of operation to the other when one of the A and B signals is true and the other is false. The reason is that, in a "selective-one-complementing" type of operation, the S flip-flop for a particular position should change its state of operation when at least one of the signals for the position has a true state corresponding to an indication of "1." The S flip-flop for the particular position should not be complemented when the values of both A and B for the position are false corresponding to values of "0." For this reason, no terms corresponding to $\bar{A}_j.\bar{B}_j$ are included in the equations for $1S_j$ and $0S_j$.

Double complementation in the state of operation of the S flip-flop for a position should theoretically occur when both the values of A and B for the position are true. For example, the S flip-flop for a position may be initially true as represented by a value of $1S_j$. When both A and B for the position are true, the value of the S flip-flop for the position should change from $1S_j$ to $0S_j$ and back to $1S_j$. Since the S flip-flop returns to its original state of operation when both A and B for the position are true, it is not necessary to include a term corresponding to $A_j.B_j$ in the logical equations for $1S_j$ and $0S_j$.

The term $R_p$ is included in the equation for $0S_j$ on an "or" basis. As previously described, the term $R_p$ represents a clearing signal which is introduced to various stages after an error operation has been performed. The $R_p$ clearing signal is introduced to the various stages so that these stages will become prepared to perform a new operation for testing any error between the next $A_1$, $A_2$ . . . $A_n$ signals and the next $B_1$, $B_2$ . . . $B_n$ signals. By including the $R_p$ term to trigger the S flip-flops for the different positions to their false states, the S flip-flops become prepared for a new operation. The reason is that the false states of operation of all of the S flip-flops indicate that there is no error. Such an indication is desirable at the beginning of a new error-testing operation.

The control matrix 101 of the error detection system 100 of Fig. 1 may be considered as comprised of $n$ similar sub-matrices each producing a pair of control signals for application to the two input circuits of an associated flip-flop in the check register 102. The above simplified partial-changing function may be written in the form of mechanization equations for each sub-matrix of the control matrix 101 as:

$$1S_j=(A_j.\bar{B}_j+\bar{A}_j.B_j)C_p$$
$$0S_j=(A_j.\bar{B}_j+\bar{A}_j.B_j)C_p+R_p$$

where $C_p$ defines a signal introduced to indicate a synchronizing "and" condition for the A and B data.

The $C_p$ signal is inserted to provide a synchronizing action so that all of the S flip-flops for the different positions can be simultaneously complemented from one state to the other in accordance with the logical equations set forth above. This is desirable in insuring that all of the S flip-flops for the different positions will be in their proper state of operation when a test as to any error is made by the error circuit 103. The clock signal $C_p$ may be obtained from a clock generator corresponding to the clock generator 112 in co-pending application Serial No. 379,045.

It should be appreciated that the above equations relate primarily to a system in which all of the A and B signals are applied simultaneously to the control matrix 101. In such an embodiment, separate "and" networks and "or" networks would be included for each position to determine if any triggering signals should be applied to the S flip-flops for that position. For example, certain "and" networks and "or" networks would be included to control the passage of a triggering signal to a line corresponding to the $1S_1$ in Figure 2. A first "and" network would receive the $A_1$ and $\bar{B}_1$ signals and a second "and" network would receive the $\bar{A}_1$ and $B_1$ signals. An "or" network would pass the signals from the first and second "and" networks to the $1S_1$ line.

Figure 2:
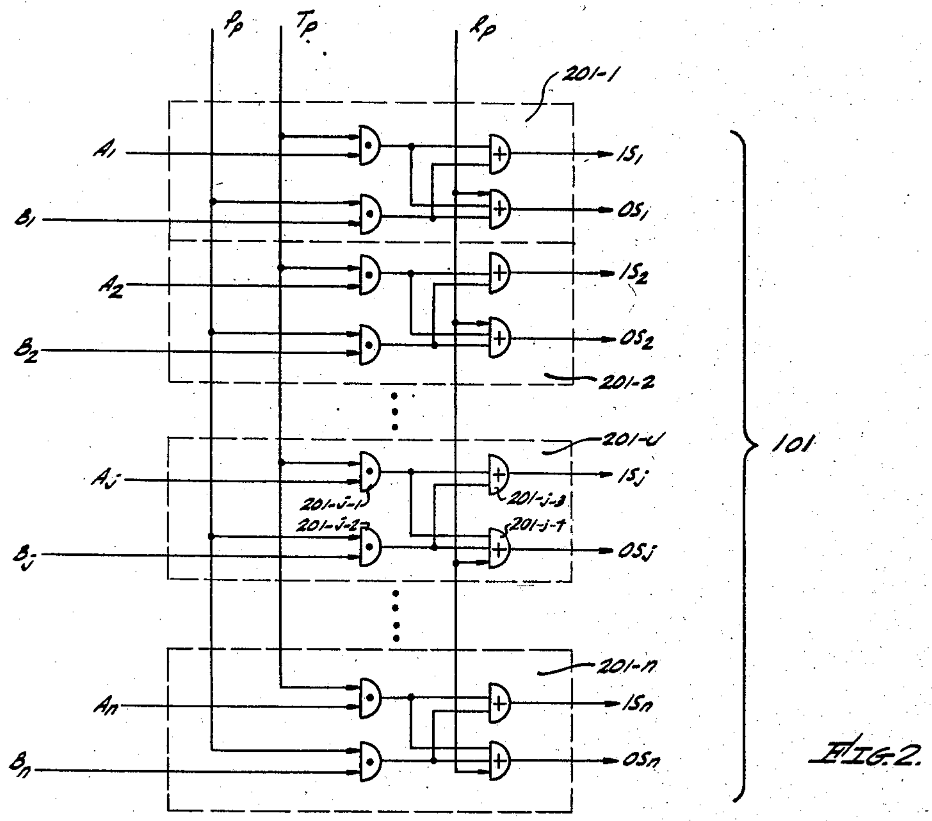
Fig. 2 is a schematic circuit diagram of the control matrix of the error detector of Fig. 1.

Similarly, other "and" networks and "or" networks would be included to control the passage of a triggering signal to a line corresponding to the $0S_1$ line in Figure 2. Still other "and" networks and "or" networks would be included to control the particular times at which triggering signals would pass to lines corresponding to the $1S_2$ and $0S_2$ lines in Figure 2. Although these "and" networks and "or" networks are not specifically shown, it is believed that a person skilled in the art would understand how to construct these networks from the above discussion and the above logical equations. This is especially true in view of the control matrix shown in Figure 2 and the subsequent discussion with respect to this control matrix.

An error detection system wherein the sub-matrices of the control matrix 101 are mechanized in accordance with the above mechanization equations is adapted to monitor a transmission or reproducing system where the A and B datum groups are either concurrently or successively applied to the error detection system; the datum of each data group being simultaneously or serially received. Assuming a system, such as that illustrated in Fig. 1, wherein all the A datum produced by the source 110 is serially received by the error detection system 100 before reception of the first B datum, the $A_j$ and $B_j$ signals are never simultaneously received; therefore the exclusive "or" function $(A_j.\bar{B}_j+\bar{A}_j.B_j)$ may be reduced to the function $(A_j+B_j)$ simplifying the above mechanization equations for the control matrix 101 to:

$$1S_j=A_j.T_p+B_j.P_p \qquad (1)$$
$$0S_j=A_j.T_p+B_j.P_p+R_p$$

where the previously defined pulses $T_p$ and $P_p$ are introduced to indicate synchronizing "and" conditions for the A and B datum signals, respectively.

The equations set forth in the previous paragraph relate to the situation where the $A_1$, $A_2$ . . . $A_n$ signals are initially applied to the control matrix 101 and the $B_1$, $B_2$ . . . $B_n$ signals are subsequently applied to the control matrix. The $A_1$, $A_2$ . . . $A_n$ signals are applied to the control matrix 101 upon the occurrence of a $T_p$ signal. This $T_p$ signal acts a synchronizing signal to insure that all of the S flip-flops for the different positions will be triggered to their proper states of operation at substantially the same instant of time. The desirability of simultaneously triggering all of the S flip-flops for the different positions to their proper states of operation has been previously discussed in detail.

The $P_p$ signal occurs after the $T_p$ signal and only when the $B_1$, $B_2$ . . . $B_n$ signals from the storage means 120–2 respectively correspond to the $A_1$, $A_2$ . . . $A_n$ signals introduced to the transfer means 120–1. This has been previously described in detail. By including the $P_p$ signal, only the $B_1$, $B_2$ . . . $B_n$ signals representing the proper value are able to pass to the control matrix 101. Furthermore, the $P_p$ signal acts as a synchronizing signal in a manner similar to the $T_p$ signal to insure that all of the S flip-flops for the different positions become simultaneously triggered to their proper values.

Since the $A_1$, $A_2$ . . . $A_n$ signals occur before the $B_1$, $B_2$ . . . $B_n$ signals, no signals would be able to pass to the S flip-flops for the different positions if the A signals and the B signals were introduced to the same "and" networks. If any signals did pass to the S flip-flops, these signals would represent wrong information.

It will be seen that the triggering of the S flip-flops to the true and false states of operation is controlled only by the true states of the A and B signals. The reason is that the A and B signals occur at different times and that the complementation of the S flip-flops from one state of operation to another for a particular position occurs only when the A signal or the B signal for the particular position is true.

Referring now to Fig. 2, there is presented a control matrix 101 comprised of a series of sub-matrices 201–1, 201–2, . . . **201–*j*, . . . 201–*n* indicated by broken lines, which produce a series of pairs of flip-flop control signals $1S_1$, $0S_1$; $1S_2$, $0S_2$; . . . $1S_j$, $0S_j$; . . . $1S_n$, $0S_n$; respectively, in response to data input signals $A_1$, $B_1$; $A_2$, $B_2$; . . . $A_j$, $B_j$; . . . $A_n$, $B_n$; respectively, reset signal $R_p$, and synchronizing signals $P_p$ and $T_p$. The sub-matrix 201–*j*** is mechanized in accordance with the mechanization Equations 1 derived above, each of the remaining control circuits being similarly mechanized by utilizing their specific input A and B data signals.

Each "and" function in Equation 1 above is provided with an "and" circuit which responds to separately applied input signals and produces a 1-representing output signal only when all input signals are simultaneously 1-representing input signals. Thus, the "and" function $A_j.T_p$ in the above mechanization equation is provided with an "and" circuit indicated by a symbol identified by **201–*j*–1 in the 201–*j* sub-matrix of Fig. 2 which responds to signals $A_j$ and $T_p$ and produces a 1-representing output signal when both $A_j$ and $T_p$ are 1-representing signals. Similarly the "and" circuit 201–*j*–2** responds to separately applied input signals $B_j$ and $P_p$ to produce a 1-representing output signal defined by the corresponding "and" function in Equation 1 above.

Each of the "or" functions in the above equations is provided by an "or" circuit responding to separately applied input signals for producing a 1-representing output signal when any one or more of the input signals is in a 1-representing state. Thus, the "or" function $A_j.T_p+B_j.P_p$ of Equation 1 is provided with an "or" circuit illustrated by a symbol identified by **201–*j*–3 in the control circuit 201–*j* of Fig. 2, which responds to separately applied $A_j.T_p$ and $B_j.P_p$ input signals and develops an output signal $1S_j$. The output signal $0S_j$ is developed by the "or" circuit 201–*j*–4** in a similar manner.

Each of the sub-matrices 201–1 through **201–*n* produces a pair of control signals such as $1S_1$, $0S_1$ and $1S_n$, $0S_n$, respectively, which are applied to the input circuits of a corresponding one of the S′ flip-flops in the check register 102** of Fig. 1. Since all the S′ flip-flops are initially set to their 0-representing state by the reset signal $R_p$, the final stable states of the S′ flip-flops, as determined by the control signals, will represent the binary half-added sum of the A and B datum groups.

As has been previously pointed out, if no error has occurred in the transfer and reproduction process of the datum group, the binary half-added sum will be zero; that is, all the S′ flip-flops in the check register 102 of the error detector system 100 of Fig. 1 will be in the 0-representing states upon completion of the half-adding process. This may be expressed logically for a binary signal E which is in a 1-representing state if an error has occurred by the function:

$$E=S_1+S_2+ \ldots +S_n$$

The above logical expression may be written in the form of simplified-partial changing mechanization equations for a flip-flop E as follows:

$$1E=(S_1+S_2+ \ldots +S_n)R_p \qquad (2)$$
$$0E=S_p$$

where the reset signal $R_p$ is introduced as an "and" function indicating when the binary half-added sum of the A and B datum group is in the S′ flip-flops, and where the setting pulse $S_p$ is introduced to set an E′ flip-flop to its zero state preparatory to monitoring the transfer of a datum group.

Referring now to Fig. 3, there is presented an embodiment of the error circuit 103 of Fig. 1 for producing a binary monitor signal E in response to a reset signal $R_p$, setting pulse $S_p$, and signals $S_1$, $S_2$, . . . $S_n$ produced by the check register 102 of Fig. 1. As shown in Fig. 3, the error circuit includes a logical matrix 303 which produces a pair of control signals 1E and 0E in response to signals $S_1$, $S_2$ . . . $S_n$, $R_p$, and $S_p$, and a flip-flop E′ having 1 and 0 input circuits responsive to the 1E and 0E control signals, respectively, and producing the binary output signal E. The logical matrix 303 is mechanized in accordance with the mechanization Equation 2 above and in view of the previous discussion on mechanization procedure, no further explanation of Fig. 3 is deemed necessary.

It should be apparent to those skilled in the art that modifications of the circuit presented in Fig. 3 may be employed for accomplishing the objectives of the error circuit 103 of Fig. 1. For example, where the error detection system of the present invention is used in combination with a transmission or reproduction system requiring intermittent or momentary error indicating signals only, the flip-flop E′ may be eliminated from the error circuit of Fig. 3, a neon light or other indicator being directly energized by the 1E binary control signals produced by the logical matrix 303. Similarly, the error circuit may be comprised of a series of indicators directly energized by the $S_1$, $S_2$, . . . $S_n$ binary signals produced by the check register 102, the state of the aggregate of the indicators after transfer of a group of data indicating the accuracy of the transfer.

From the foregoing discussion, it is apparent that the present invention provides an error detection system for monitoring the transfer and reproduction at a receiver of a group of binary-coded information data from a source by selectively complementing the binary digits of an indicator datum such as the check register 102 in accordance with the corresponding binary digits of the datum group at a source such as the tape read unit 110 and at a receiver such as the character storage means 120–2. A serial embodiment of the present invention has been described in combination with a reproducing system for monitoring the reproduction by a utilization device, such as a type-character printer, of a group of information data read from a source, transferred into a storage medium to the utilization device. The monitoring system described in the preceding sentence may be considered to include the control matrix 101, the check register 102 and the error circuit 103. It is obvious, however, from the foregoing discussion, that the error detection system of the present invention is readily adaptable to operation in combination with transmission or reproducing systems wherein the information data at the source and at the receiver are simultaneously available. In addition, it should be apparent that there are a considerable number of obvious variations of the error detecting system of the present invention utilizing modified control matrix and check register (101 and 102, Fig. 1) structures. For example, serially received indicator datum signals, generated by a slightly modified check register or an external generator, may be selectively complemented in accordance with the original and reproduced datum signals by a slightly modified species of the control matrix for directly producing the monitor datum signals in a serial fashion.

Although the present invention has been described in relation to binary electrical pulses, it should be apparent that the principles herein taught are equally applicable to any two-condition signal system such as mark space, symmetrical wave, or carrier modulation system. It should be further apparent that the present invention is not limited to purely binary number system but is equally operable with any binary digit coded system such as the binary-coded decimal system, the binary-coded octal system, and the like.

The embodiments herein described utilize electrical signals, electrical gating circuits, and electronic flip-flops, but it should be clearly understood that the principles herein taught are equally applicable to electro-mechanical, mechanical, hydraulic, or chemical components having similar gating features, two stable states, and storage capacity.

What is claimed as new is:

1. In combination for determining an error between a first plurality of signals digitally representing a first quantity and a second plurality of signals digitally representing a second quantity, a check register including a plurality of bistable members having first and second states of operation, a control matrix including a plurality of "and" networks and "or" networks connected in a logical pattern and coupled to the bistable members for receiving the signals in the first and second pluralities and for passing to each bistable member in the check register the signals representing a different digital position upon the occurrence of signals having characteristics representing particular indications to obtain a triggering of the bistable member from one state of operation to the other upon the introduction of the signals to the bistable member, the control matrix including at least one "or" network for initially passing signals to the bistable members to trigger the bistable members to their first states of operation, and an error circuit including at least one "and" network and at least one "or" network connected in a logical interrelationship and coupled to the bistable members for providing a first signal to represent a lack of any error upon the occurrence of first states of operation in the bistable members after the introduction of the signals in the first and second pluralities and for providing a second signal to represent an error upon the occurrence of the second state of operation of at least one bistable member in the plurality after the introduction of the signals in the first and second pluralities.

2. In combination for determining an error between a first plurality of signals digitally representing a first quantity and a second plurality of signals digitally representing a second quantity, a plurality of bistable members each having first and second states of operation and each adapted to indicate a different digital position, a control matrix including a plurality of "and" networks and a plurality of "or" networks formed from diodes and connected in a logical interrelationship and coupled to the bistable members for passing signals having first characteristics in the first and second pluralities and for introducing these signals to the different bistable members in the plurality in accordance with the digital position represented by the signals and the digital positions represented by the bistable members and including at least one "or" network for initially triggering the bistable members to their first states of operation, means coupled to the control matrix for initially introducing the signals in the first plurality to the control matrix for the passage to the bistable members of the signals having first characteristics, means coupled to the control matrix for subsequently introducing the signals in the second plurality to the control matrix for the passage to the bistable members of the signals having first characteristics, and an error circuit including at least one "and" network and at least one "or" network formed from diodes and connected in a logical interrelationship and coupled to the bistable member for providing a first signal upon the operation of the bistable members in their first state after the introduction of the signals in the first and second pluralities and for providing a second signal upon the operation of at least one of the bistable members in their second state after the introduction of the signals in the first and second pluralities.

3. The error detecting system defined in claim 2 wherein said control matrix includes $n$ submatrices, each of said submatrices being formed from a plurality of diodes and being serially responsive to a different pair of signals $A_j$ and $B_j$ having corresponding digital significance in the first plurality of signals from the transfer means and the second plurality of signals from the character storage means the subscript $j$ indicating any particular binary-digit place, and to synchronizing signals $T_p$ and $P_p$ for the transfer means and the character storage means, respectively, for producing a pair of binary control signals $1S_j$ and $0S_j$, and wherein each of said bistable storage elements is a flip-flop, each being coupled to the control matrix to be initially set to its first state by a reset pulse $R_p$ from the control matrix and having first and second 0 input circuits responsive to signals $1S_j$ and $0S_j$, respectively, for producing the first and second states in the flip-flop and each flip-flop producing complementary output signals $S_j$ and $\bar{S}_j$ representing the first and second states in the flip-flop; each of said submatrices being connected in accordance with the logical expressions:

$$1S_j = A_j.T_p + B_j.P_p$$

$$0S_j = A_j.T_p + B_j.P_p + R_p$$

where the (.) and the (+) represent the logical "and" and "or," respectively, and the (‾) represents the complementary state of the signal.

4. The error detecting system defined in claim 3 which further includes an error circuit formed from a plurality of diodes and coupled to said flip-flops and responsive to signals $S_1, S_2, \ldots S_n, R_p$, and to a setting signal $S_p$, for producing a binary signal E representing a first state in response to an error in the transfer of the information data group from the transfer means to the character storage means, said error circuit including an error matrix responsive to signals $S_1, S_2, \ldots S_n, R_p$, and $S_p$, for producing actuating signals 1E and 0E, and a flip-flop included in said error circuit and having 1 and 0 input circuits responsive to signals 1E and 0E, respectively, for producing the error signal E; said error matrix being connected in accordance with the logical expressions:

$$1E = (S_1 + S_2 + \ldots S_n)R_p$$

$$0E = S_p$$

where the (.) and the (+) represent the logical "and" and "or," respectively.

5. In combination for determining an error between a first plurality of signals digitally representing a first quantity and a second plurality of signals digitally representing a second quantity, transfer means for receiving the signals in the first plurality, character storage means for receiving intermittent signals and for providing a count at any instant of the number of intermittent signals received, a comparator for comparing the signal indications in the transfer means and the signal indications in the character storage means and for providing an activating signal upon a coincidence of the signal indications in the transfer means and the character storage means, a plurality of bistable members each having first and second states of operation and each adapted to indicate the state of a different digital position, a control matrix including a plurality of "and" networks and a plurality of "or" networks formed from diodes and connected in a particular relationship and coupled to the bistable members for initially introducing signals to the bistable members for a triggering of the members into their first states of operation and for subsequently introducing the signals in the first plurality and the signals in the second plurality upon the production of the activating signal for changes in the state of operation of the bistable members in accordance with the digital positions represented by the bistable members and the digital positions represented by the signals and the characteristics of the signals, and an error circuit including at least one "and" network and at least one "or" network formed from diodes and connected in a logical relationship and coupled to the bistable members for providing a first signal representing no error upon the operation of the bistable members in their first states after the introduction of the signals in the first and second pluralities to the control matrix and for providing a second signal representing an error upon the operation of at least one of the bistable members in their second state after the introduction of the signals in the first and second pluralities to the control matrix.

References Cited in the file of this patent

UNITED STATES PATENTS

| | | |
|---|---|---|
| 2,388,354 | Wheeler | Nov. 6, 1945 |
| 2,604,262 | Phelps et al. | July 22, 1952 |
| 2,634,052 | Block | Apr. 7, 1953 |
| 2,689,950 | Bayliss et al. | Sept. 21, 1954 |
| 2,700,755 | Burkhart | Jan. 25, 1955 |
| 2,737,342 | Nelson | Mar. 6, 1956 |
| 2,789,759 | Tootill et al. | Apr. 23, 1957 |

OTHER REFERENCES

Progress Report (2) on the Edvac-Moore School of Elec. Eng., Univ. of Pa. June 30, 1946; declassified February 13, 1947, pages 1-4-6, 1-4-7, and sheet of dwg. PY-0-230.

UNITED STATES PATENT OFFICE
Certificate of Correction

Patent No. 2,897,480 July 28, 1959

Tom T. Kumagai

It is hereby certified that error appears in the printed specification of the above numbered patent requiring correction and that the said Letters Patent should read as corrected below.

Column 7, line 52, the central portion of the equation should read as shown below instead of as in the patent:

$$+\overline{A}_i^2 \cdot B_i^2) + S_i^1$$

line 60, for "member" read —number—; column 10, line 50, after "acts" insert —as—.

Signed and sealed this 12th day of April 1960.

[SEAL]

Attest:

KARL H. AXLINE,
*Attesting Officer.*

ROBERT C. WATSON,
*Commissioner of Patents.*